United States Patent Office 2,785,165
Patented Mar. 12, 1957

2,785,165

PREPARATION OF 4-AMINOQUINOLINE

Richard U. Schock, Waukegan, Ill., and Herman J. Eichel, Dayton, Ohio, assignors to Abbott Laboratories, North Chicago, Ill., a corporation of Illinois No Drawing. Application December 22, 1953, Serial No. 399,834

2 Claims. (Cl. 260—288)

This invention relates to a new class of chemical compounds which are notable for their activity against protozoan diseases as that caused by *Endamoeba histolytica*, intermediates in the synthesis thereof, and to the method of making them.

Compounds of the class referred to in this invention are represented by the formula

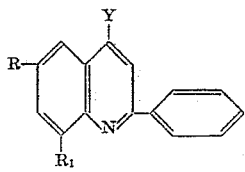

wherein R is hydrogen, halogen, lower alkyl, lower alkoxy, nitro, amino or acetamido and $R_1$ is hydrogen, halogen, lower alkyl or lower alkoxy, with the further provision that at least one of R and $R_1$ must be other than hydrogen, Y is hydroxyl, halogen or

where $R_2$ and $R_3$ are hydrogen, benzyl or lower alkyl. The invention also pertains to the acid addition salts and quaternary ammonium salts of the bases shown in the formula. By acid addition salt is meant the hydrochloride, sulfate and the like.

The compounds referred to herein in which Y is a nitrogen containing group have demonstrated high activity against protozoan diseases such as those caused by *Endamoeba histolytica* and are considered to be quite useful in the control of amebiasis. The compounds in which Y is hydroxyl or halogen are useful intermediates in the preparation of the foregoing physiologically active chemicals.

The general scheme of synthesis of a representative compound involves the preparation of an ethyl β-(substituted anilino)-cinnamate by one of two methods outlined later in the examples. The cinnamate is then cyclized to a 2-phenyl-4-hydroxy-6 or 8 substituted quinoline by heating to about 250° C. in Dowtherm A. The 2-phenyl-4-hydroxy-6 or 8 substituted quinoline is refluxed with phosphorous oxychloride to form the 2-phenyl-4-chloro-6 or 8 substituted quinoline. Thereafter the 4-chloro derivative previously described is heated with a salt of an amine (such as the acetate) in phenol to form the 2-phenyl-4-amino-6 or 8 substituted quinoline. In place of the amino group in the 4 position we may have the benzylamino group, the methylamino, ethylamino and other lower alkylamino groups and the dimethylamino, diethylamino and di (lower) alkylamino groups.

As substituents in the 8 position we may have hydrogen, halogen, lower alkyl or lower alkoxy groups, i. e. chloro, bromo, iodo, methyl, ethyl, methoxy and ethoxy groups. As substituents in the 6 position we may have, in addition to those found in the 8 position, the nitro, amino or acetamido groups. It must be understood however that at least one of the groups in the 6 and 8 positions must be other than hydrogen.

The following examples are presented in order to disclose the invention in detail but without, however, intending to limit the invention in any way.

EXAMPLE I

*Ethyl β-(p-methoxyanilino)-cinnamate*

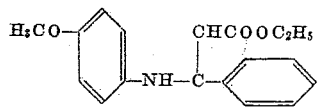

96.1 g. (0.5 mol) of ethyl benzoylacetate and 62 g. p-anisidine are dissolved in 500 cc. anhydrous ethanol. 50 g. drierite and ½ cc. conc. HCl are added and the mixture is refluxed 24 hours. At the end of this time the solution is filtered hot and cooled in an ice bath. The crystals are removed by filtration and washed with cold alcohol. The crude material is used in the cyclization; yield about 80 g.

Alternatively a second method may be used to prepare certain members such as those obtained from chloro or nitro substituted anilines. Either benzene, toluene or xylene is used as solvent, depending on the reflux temperature required to effect condensation. For example ethyl β-(o-chloroanilino)-cinnamate is prepared by dissolving 96.1 (0.5 mol) ethyl benzoylacetate and 63.8 g. (0.5 mol) o-chloroaniline in 500 cc. anhydrous toluene and a trace (few mg.) of p-toluenesulfonic acid is added. The solution is refluxed using a water separator between flask and condenser until the theoretical amount of water has separated (9 ml.). The solvent is removed under vacuum and alcohol is added to the residual oil. On scratching and cooling crystals separate which are filtered and washed with cold alcohol. The crude product is dissolved in boiling alcohol and filtered hot from a difficultly soluble residue. On cooling the filtrate, crystals separate of still crude product. This, however, can be used as such for the cyclization reaction. Yield about 80 g.

Other similar cinnamates are made in the same way and the data is summarized in the following table:

| Amine | Yield, percent | M. P., °C. | Analysis | |
|---|---|---|---|---|
| | | | N. Found | N. Calc. |
| p-anisidine | 53 | 111–113 | 4.89 | 4.71 |
| o-chloroaniline | 53–54 | | | |
| p-chloroaniline | 30 | 107–108 | 4.76 | 4.63 |
| p-nitroaniline | | | | |
| o-toluidine | 43 | 99–100 | 5.11 | 4.98 |
| p-toluidine | 18 | 71–72 | 5.15 | 4.98 |
| p-amino acetanilide | 50 | 203–204 | 8.68 | 8.64 |
| o-anisidine | 29 | 102 | 4.98 | 4.71 |

EXAMPLE II

*2-phenyl-4-hydroxy-6-methylquinoline*

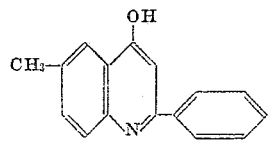

24 g. of crude ethyl β-(p-toulidino)-cinnamate is added slowly and with constant stirring to 200 cc. Dowtherm A heated to 250–260° C. When all has been added the mixture is heated 15 minutes longer then cooled to room temperature and placed in an ice bath. The crystals are filtered and washed with alcohol then purified by boiling with alcohol and filtering. The filtrate is cooled and the crystals obtained are added to the residue. Total yield about 14.5 g.

Other 2-phenyl-4-hydroxyquinolines are made in the same way and the data is summarized herewith:

| Substituent | Yield, percent | M. P., °C. | Analysis | |
|---|---|---|---|---|
| | | | N. Found | N. Calc. |
| 6-chloro | 75 | | 5.41 | 5.49 |
| 6-methyl | 75 | | 6.01 | 5.95 |
| 8-methyl | 58 | | 6.13 | 5.95 |
| 6-acetamido | 85 | 300 | 10.16 | 10.07 |
| 6-methoxy | | | | |
| 8-methoxy | 79 | 167–169 | 5.54 | 5.57 |

EXAMPLE III

*2-phenyl-4-chloro-6-methylquinoline*

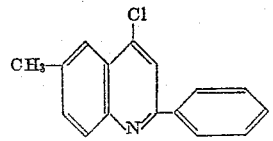

10 g. (0.042 mol) of 2-phenyl-4-hydroxy-6-methylquinoline are placed in 15 cc. phosphorous oxychloride and heated under light reflux for 2 hours, then allowed to stand overnight. The solid mass of crystals are placed on a Buchner funnel and washed with Skellysolve B. The residue is added to water and heated until solution is complete. Concentrated KOH solution is added until basic, the crystals are filtered, washed with water and the crude product recrystallized from alcohol. Yield about 9.8 g., M. P. 93–95°.

Other 2-phenyl-4-chloroquinolines are made in the same way and the data is summarized in the following table:

| Substituent | Yield, percent | M. P., °C. | Analysis | |
|---|---|---|---|---|
| | | | N. Found | N. Calc. |
| 6-methyl | 92 | 93–95 | 5.62 | 5.52 |
| 8-methyl | 100 | 83–85 | 5.52 | 5.52 |
| 6-acetamido | 75 | 212–214 | 9.31 | 9.44 |
| 6-methoxy | | 98–100 | 5.52 | 5.20 |
| 8-methoxy | 72 | 93–95 | 5.42 | 5.20 |
| 6-chloro | 95 | 111–112 | 4.03 | 5.11 |

EXAMPLE IV

*2-phenyl-4-dimethylamino-6-methoxyquinoline*

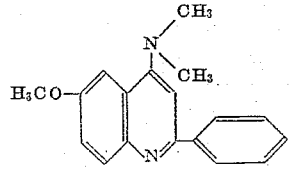

5.4 g. (0.02 mol) of 2-phenyl-4-chloro-6-methoxyquinoline, 3.3 g. (0.04 mol) of dimethylamine hydrochloride, 3.3 g. sodium acetate (0.04 mol) and 18 g. phenol (approx. 0.2 mol) are heated at 190–200° for 8 hours in an oil bath. After cooling to room temperature a large excess of acetone is added and the amine salt is filtered and washed with acetone. The salt is dissolved in water, made alkaline with KOH and heated on a steam bath to remove dimethylamine. The oil is taken up in ether, dried over MgSO4 and ethereal HCl added to precipitate the hydrochloride. The salt is recrystallized from alcohol. Yield about 5.1 g.

Other 2-phenylquinolines substituted in the 4, 6 and 8 positions are made in the same way and data on the hydrochlorides are summarized in the following table:

| Substituent | Yield, percent | Analysis | |
|---|---|---|---|
| | | N. Found | N. Calc. |
| 6-methoxy-4-amino | 37 | 11.53 | 11.20 |
| 6-methyl-4-amino | 74 | | |
| 8-methyl-4-amino | 98 | 10.36 | 10.36 |
| 6-methoxy-4-benzylamino | 69 | 7.48 | 7.44 |
| 8-methyl-4-dimethylamino | 42 | 9.30 | 9.38 |
| 6-methoxy-4-dimethylamino | 81 | 8.24 | 8.90 |
| 6-methoxy-4-methylamino | 31 | 9.82 | 9.32 |
| 8-methyl-4-methylamino | 98 | 9.52 | 9.82 |

EXAMPLE V

*2-phenyl-4-amino-6-methylquinoline*

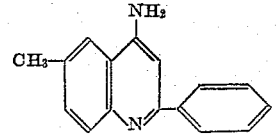

A Hastelloy bomb is loaded with 3 g. of 2-phenyl-4-chloro-6-methylquinoline, 1.11 g. of phenol and 50 cc. of liquid ammonia. The bomb is sealed and heated for 10 hours at 200° C. The reaction material is washed from the bomb with acetone and the liquid is filtered. The filtrate is concentrated in vacuo and triturated in dilute sodium hydroxide. After filtration and washing there is obtained 2.5 g. of a solid having a melting point of 173–175° C. A portion is recrystallized from 50% ethanol and was found to have a melting point of 182–187° C. The analysis calculated for the formula C16H14N2 was found to have a nitrogen value of 11.69% as contrasted to a calculated nitrogen value of 11.96%.

The hydrochloride of the base was prepared by dissolving 2.5 g. of the base in 40–50 cc. of hot alcoholic HCl containing approximately 1.8 g. HCl per cc. The material is treated with darco filter aid and was filtered and allowed to cool. The solid was washed with acetone and dried in a vacuum oven. 1.6 g. of reaction product was obtained having a melting point of 305–308° C. The calculated analysis (C16H15N2Cl) was C, 70.97%; H, 5.58%; N, 10.35%. Analysis found: C, 70.37%; H, 5.89%; N, 9.76%.

We have also found that it is highly desirable to extemporize the amine salt in the final step of the synthesis wherein the 4-chloro derivative of the substituted quinoline is heated with an amine salt to form the 4-amino or 4-substituted amino derivative. For example we prefer to conduct the reaction between the 4-chloro derivative and a mineral acid salt of an amine having the formula

where R2 and R3 are from the group consisting of hydrogen, benzyl and lower alkyl, in the presence of an alkali metal or ammonium salt of a lower fatty acid, such as sodium, potassium or ammonium acetate, propionate or butyrate. See Example IV for details of the reaction. An amine salt of said fatty acid is formed in situ which reacts with the 4-chloroquinoline derivative to produce the 4-amino derivative in good yield.

Others may practice the invention in any of the numerous ways which will be suggested to one skilled in the art. It is considered that all such practice of the invention will be covered hereunder provided it falls within the scope of the appended claims.

We claim:

1. In the method of synthesizing a substituted 2-phenylquinoline having an amine group in the 4 position, the step which comprises heating a 2-phenyl-4-chloroquinoline with a mineral acid salt of an amine having the formula

where $R_2$ and $R_3$ are from the group consisting of benzyl and lower alkyl, in the presence of an alkali metal salt of a lower fatty acid.

2. In the method of synthesizing a substituted 2-phenylquinoline having an amine group in the 4-position, the step which comprises heating a 2-phenyl-4-chloroquinoline with a mineral acid salt of an amine from the group consisting of methylamine, dimethylamine and benzylamine, in the presence of sodium acetate.

References Cited in the file of this patent
UNITED STATES PATENTS 2,546,658   Surrey _____ Mar. 27, 1951

OTHER REFERENCES

John et al.: (I) J. prakt. Chem., vol. 130, pp. 289–292 (1931).
John et al.: (II) J. prakt. Chem., vol. 132, pp. 15–23 (1931).
Elderfield et al.: J. Am. Chem. Soc., vol. 68, pp. 1272–6 (1946).
Drake et al.: J. Am. Soc., vol. 68, pp. 1208–13 (1946).
John et al.: (III) J. prakt. Chem., vol. 130, pp. 304–341 (1931).